United States Patent
Briand et al.

(10) Patent No.: US 7,289,157 B2
(45) Date of Patent: Oct. 30, 2007

(54) METHOD FOR DETECTING SATURATION OF A MOTION VECTOR FIELD

(75) Inventors: Gérard Briand, Ploufragan (FR); Juan Moronta, Rennes (FR); Alain Verdier, Vern sur Seiche (FR)

(73) Assignee: Thomson Licensing, Boulogne-Billancourt (FR)

( * ) Notice: Subject to any disclaimer, the term of this patent is extended or adjusted under 35 U.S.C. 154(b) by 466 days.

(21) Appl. No.: 10/276,830

(22) PCT Filed: May 9, 2001

(86) PCT No.: PCT/FR01/01394

§ 371 (c)(1),
(2), (4) Date: May 19, 2003

(87) PCT Pub. No.: WO01/89211

PCT Pub. Date: Nov. 22, 2001

(65) Prior Publication Data

US 2003/0202593 A1  Oct. 30, 2003

(30) Foreign Application Priority Data

May 19, 2000  (FR) .................................. 00 06422

(51) Int. Cl.
*H04N 5/14* (2006.01)
*H04N 7/01* (2006.01)
*H04N 7/12* (2006.01)
*H04N 9/64* (2006.01)
*H04N 11/02* (2006.01)
*H04N 11/04* (2006.01)
*H04N 11/20* (2006.01)

(52) U.S. Cl. ...................... 348/441; 348/452; 348/699; 375/240.16

(58) Field of Classification Search ................. 348/441, 348/452, 699; 375/240.16; 382/260, 300
See application file for complete search history.

(56) References Cited

U.S. PATENT DOCUMENTS

| 5,208,667 | A | * | 5/1993 | Saunders ..................... 348/452 |
| 5,661,525 | A | * | 8/1997 | Kovacevic et al. ......... 348/452 |
| 5,673,081 | A | * | 9/1997 | Yamashita et al. ............ 348/42 |
| 5,682,437 | A | * | 10/1997 | Okino et al. ................. 382/100 |
| 5,777,666 | A | * | 7/1998 | Tanase et al. .................. 348/43 |
| 5,786,862 | A | * | 7/1998 | Kim et al. ................... 348/448 |
| 5,959,681 | A | * | 9/1999 | Cho ........................... 348/452 |
| 5,973,733 | A | * | 10/1999 | Gove ..................... 348/208.13 |
| 5,995,154 | A | * | 11/1999 | Heimburger ................ 348/448 |
| 6,160,586 | A | * | 12/2000 | Justiss et al. ............... 348/452 |

(Continued)

FOREIGN PATENT DOCUMENTS

EP           645 933  A2     3/1995

(Continued)

*Primary Examiner*—Brian P. Yenke
(74) *Attorney, Agent, or Firm*—Joseph J. Laks; Ronald H. Kurdyla; Jeffrey M. Navon

(57) ABSTRACT

The process is characterized in that it performs:
  counting of the number of motion vectors, at least one component of which is greater than a predetermined value less than the maximum value,
  comparision of this number with at least one predetermined threshold, and in that the motion vector field is declared saturating if this number is greater than the predetermined threshold.

Application relates to image interpolation.

8 Claims, 1 Drawing Sheet

U.S. PATENT DOCUMENTS

| | | | |
|---|---|---|---|
| 6,169,817 B1 * | 1/2001 | Parker et al. | 382/131 |
| 6,192,080 B1 * | 2/2001 | Sun et al. | 375/240.16 |
| 6,385,245 B1 * | 5/2002 | De Haan et al. | 375/240.16 |
| 6,452,639 B1 * | 9/2002 | Wagner et al. | 348/448 |
| 6,625,333 B1 * | 9/2003 | Wang et al. | 382/300 |
| 6,665,439 B1 * | 12/2003 | Takahashi | 382/199 |
| 2001/0017889 A1 * | 8/2001 | Borer | 375/240.16 |

FOREIGN PATENT DOCUMENTS

| | | |
|---|---|---|
| GB | 2 277 022 A | 10/1994 |
| GB | 2 311 184 A | 9/1997 |

* cited by examiner

METHOD FOR DETECTING SATURATION OF A MOTION VECTOR FIELD

This application claims the benefit under 35 U.S.C. §365 of International Application PCT/FR01/01394, filed May 9, 2001, which claims the benefit of French Application 0006422, filed May 19, 2000.

BACKGROUND OF THE INVENTION

The invention relates to a process and device for detecting saturation of a motion vector field.

Frame frequency conversion, for example during a conversion of standard, generally calls upon two processes:
- motion estimation which yields a vector field faithful to the spatio-temporal evolution of the objects constituting the scene,
- interpolation which may make use of this vector field to correctly position the objects in an intermediate frame to be constructed.

Motion-compensated interpolations, applied conventionally in frame frequency conversion, are not always suitable for all the situations encountered in a video sequence. The motion estimators and the associated interpolators do not support unlimited amplitudes of motion vectors. Constraints of hardware construction or even software constraints require that maximum operating values be fixed. Beyond these values, the procedures give rise to malfunctions.

The problem is therefore to evaluate the degree of confidence that can be accorded to a motion vector field in order to obtain interpolated images of good quality. Taking account merely, for such an evaluation, of the number of motion vectors of the vector field, whose level corresponds to the saturation threshold, is not sufficient. It does not make it possible to obtain interpolated images of good quality in numerous configurations, for example during large motions of objects of small dimension in the image.

BRIEF SUMMARY OF THE INVENTION

The aim of the invention is to alleviate the aforesaid drawbacks.

Its subject is a process for detecting saturation of a motion vector field relating to an image at the instant t, characterized in that it comprises the steps of:
- counting a number of motion vectors, at least one component of which is greater than a predetermined value less than the maximum value,
- comparing this number with at least one predetermined threshold, and in that the motion vector field is declared saturating if this number is greater than the predetermined threshold.

According to a particular characteristic, it comprises an additional step of chopping the image into subimages m, the counting being performed for each subimage m so as to yield a number Nb_sat(m,t), the comparison being performed for each of the subimages and the field being declared saturating if this number is greater than the predetermined threshold for at least one of the subimages.

According to a particular characteristic, the field is declared saturating if at least one of the subimages possesses a number of vectors which is greater than a first threshold and the field is declared nonsaturating if the set of subimages possesses a number of vectors Nb_sat(m,t) which is less than a second predetermined threshold.

The invention also relates to a process for interpolating an image sequence implementing a first type of interpolation on the basis of motion vectors and a second type of interpolation disregarding the motion vectors, characterized in that, if the motion vector field of the current image is declared nonsaturating, the first type of interpolation is implemented, in that, if the motion vector field of the current image is declared saturating, the second type of interpolation is implemented, in that, if the motion vector field is not declared saturating or nonsaturating, the same type of interpolation as for the previous image is implemented.

The invention also relates to a device for image interpolation comprising a motion estimation circuit providing a motion vector field, a first circuit for temporal interpolation as a function of the motion vector field and a second circuit for non-motion-compensated temporal interpolation, characterized in that it also comprises a motion field saturation detection circuit receiving the motion vector field and implementing the process for detecting saturation and switching the output of the first interpolator or of the second interpolator over to the output of the device according to whether the circuit detects a nonsaturating or saturating field respectively.

The process formulates a confidence parameter which can be associated with a previously estimated motion vector field. This parameter is global to the frame and allows a particular mode of use of the motion field. For example in frequency conversion, when this confidence is zero for the motion vector field, the motion-compensated interpolation is avoided. The value of this parameter can thus control a more suitable interpolation configuration.

The characteristics and advantages of the present invention will become better apparent from the following description which is given by way of example and with reference to FIG. 1 which represents an interpolation device implementing the process according to the invention.

In a known manner, a motion vector field is previously estimated for each of the images of an image sequence. This field originally comprises two components along the horizontal axis and the vertical axis. It is the horizontal component which is chosen here as being the most representative of the motion on a screen. The eye is more sensitive to horizontal movement and the horizontal dimension of the screen is generally larger, in particular when dealing with a 16/9 display. It is however entirely conceivable to argue on the basis of two types of detectors, one associated with the horizontal component, the other with the vertical component and to combine their results, for example by prohibiting the application of motion-compensated interpolation if at least one of the two saturation detectors is triggered.

The motion vector fields are estimated on the basis of motion estimation algorithms and the range of motion estimation is generally dependent on the computational capabilities brought into play, computational times tolerated, accuracies desired, etc. Stated otherwise, maximum amplitudes of motion vectors, which are generally much smaller than the dimensions of the image, are imposed. This involves saturation thresholds, and for each component, maximum values which can be taken by the components of the motion vectors. The motion estimation and the application situated downstream thereof are therefore assumed to operationally support these maximum values of motion vector which are handled.

The process according to the invention is based on the counting of vectors exceeding a detection threshold below the saturation threshold which corresponds to this maximum operational amplitude. If the number of vectors counted exceeds a certain threshold, the vector field is declared saturating.

By choosing a margin with respect to the maximum levels permitted for the motion vectors, in order to declare that the motion vector field is saturating, it is possible to improve the reliability of the detector and hence the confidence level of the detection. This is especially true for motion estimators utilizing algorithms whose initialization is performed on the basis of values emanating from the spatial or temporal environment of the pixel, for example motion estimators of recursive type.

This may involve block matching motion estimators, whose search window can be defined by recursivity, it may also involve motion estimators of recursive PEL type.

If such an environment corresponds to a saturating and hence false vector, there is a high probability that the algorithm will yield, by performing its iterations from a false value, a vector neighbouring the saturating vector. This vector is also false although not saturating.

It is in fact a matter of doing away with the oscillations about the maximum values permitted by the system, oscillations due to the fact that the algorithm generally fixes computational limits about these initial values.

In an exemplary embodiment, the system operationally supports amplitudes of the horizontal component of vectors ranging from −32 to +31. The integer part of the horizontal component, in which one is interested, if therefore coded on 5 bits.

The saturation detection threshold is situated for example at −28 and +28, that is to say plainly below these maxima. The values close to −32 and +31 are regarded as unreliable values since they are close to saturation and the detection system is based on counting up the number of vectors lying in these zones of values, that is to say from −28 to −32 and from +28 to +31.

According to another characteristic of the invention, the motion vector field of the image is partitioned into subimages of vectors of equal size. The image is partitioned into subimages and it is the vector fields relating to each subimage which are considered, these fields being referred to as vector subimages.

In an exemplary embodiment, eight subimages have been adopted, division by two on the vertical axis and division by four on the horizontal axis.

For each subimage of vectors, a histogram is compiled: HISTO[m, n, t] where m is the subimage, n the amplitude of the motion vector for the horizontal component and t the current frame instant. HISTO[m, n, t] therefore represents the number of samples or pixels, in subimage m of frame or image T(t), whose horizontal component has the value n.

The number of subimages will be called M and the maximum operational amplitude supported by the system will be called N.

To compile these histograms, each subimage m is traversed individually. The accuracy adopted for the vectors, determining the number of elements of the histograms, is directly related to the fineness of detection. In experimentation, an accuracy of a pixel distance was retained, corresponding to a distance of Wx/720 for a screen width Wx, a line consisting of 720 pixels.

for each subimage histogram, the vectors whose amplitude overshoots a certain so-called detection threshold, which is different from the saturation threshold, are counted up. This detection threshold called S_Sat is the same for all histograms.

The amplitude overshoots are counted up for each subimage m in the following way:

$$\text{Nb\_Sat}(m, t) = \sum_{n=-N}^{n=-S\_Sat} \text{Histo}(m, n, t) + \sum_{n=+S\_Sat}^{n=+(N-1)} \text{Histo}(m, n, t)$$

On the basis of the M countings of overshoot Nb_Sat (m, t), a test is carried out to formulate a global saturation variable Sat_Glob(t), which variable makes it possible to define the motion vector field attached to the frame or image T(t) as saturating or nonsaturating field.

This variable Sat_Glob(t) is in fact a confidence parameter which will apprise of the relevance of the motion field in terms of overshoot of permitted amplitude. If the vector field contains too large a concentration of vectors of amplitude greater than a certain threshold, then the system switches to saturated mode causing a specific behaviour of the application situated downstream.

It is actually the vector field of the complete image which is or is not declared saturated, since choosing a type of processing based on subimage would create defects perceptible to the eye. The choice of an interpolation specific to an image zone corresponding to a subimage would be too visible to the eye.

This variable Sat_Glob(t) is formulated from two thresholds which make it possible to put in place a temporal hysteresis. The higher threshold Sat_Compt_H is used to go to saturated mode (Sat_Glob (t)=1) whereas the low threshold Sat_Compt_B serves for the drop to nonsaturated mode (Sat_Glob (t)=0).

The switching conditions are as follows:
If Nb_Sat(m,t)≧Sat_Compt_H for at least one subimage m,
then Sat_Glob (t)=1
The motion vector field is declared saturated.
If Nb_Sat(m,t)≦Sat_Compt_B irrespective of m, that is to say for all the subimages,
then Sat_Glob (t)=0
The motion vector field is declared nonsaturated.
If neither of these two conditions is satisfied
then Sat_Glob (t)=Sat_Glob (t−1)
The motion vector field retains its previous status, that assigned to the motion vector field of the previous frame or image T(t−1).

For the frame frequency conversion application from which this process stems and for which N, maximum operational amplitude, is equal to 32, the following threshold values have been adopted:
S_Sat=28
Sat_Compt_H=⅓ of the number of pixels in the subimage
Sat_Compt_B=⅕ of the number of pixels in the subimage
For safety the variable Sat_Glob(t) is initialized to 0 on system startup.

The detection criteria and the thresholds given as an example have been optimized for the frame frequency conversion application. For other applications and depending on the role which this parameter will have to play, new thresholds will be adopted.

By separately considering each vector subimage instead of the global vector field of the complete image it is possible to improve the sensitivity to local phenomena. The eye is actually sensitive to defects, even point-like defects, for example on an object corresponding to a small zone of the image, moving very rapidly in the image. A global analysis of the image would not allow easy detection of these local overshoots of amplitude. Thus, by chopping into subimages it is possible to take account of isolated overshoot phenomena. However, the dimension of these subimages must remain big enough for the numbering which is carried out to remain robust.

The detection of saturation in a vector field makes it possible to safeguard the systems against malfunctions due to overshoots of the amplitude which is tolerated by them. The variable formulated is a parameter moreover associated with the vector field and which can be utilized by the motion compensation application situated downstream.

The hysteresis installed constitutes of itself a temporal filter of the saturation information, the temporal switchings are lasting. Overly frequent switchings are avoided making it possible to limit the defects of continuity in the image sequence.

In a frame tempo conversion application, untimely or short-duration switchings are indeed undesirable since ultimately they are highly visible relative to lasting switchings.

This process although tailored within a frame tempo interpolation context can also be associated with other confidence criteria for other types of processing. The detection thresholds can be adapted to each system as a function of its abilities and as a function of the processing to be protected.

Without departing from the realm of the invention, it is also possible to utilize subimages of different size, each threshold for subimage then being corrected of a coefficient dependent on the ratio of the number of pixels in a subimage to the number of pixels in the global image.

It is also possible to modulate the sensitivity of detection as a function of the geographical position of the subimages by choosing a different detection threshold for certain subimages or by choosing thresholds relating to the number of vectors counted Nb_Sat(m, t) which are different for certain subimages. It is thus possible to improve the detection for example for the subimages at the centre of the screen, the viewer being more sensitive to defects in respect of these subimages. In fact, a threshold value can be assigned to each subimage according to the sensitivity that one wishes to allocate to it.

BRIEF DESCRIPTION OF THE DRAWINGS

The invention also relates to an interpolation device implementing the process described above.

Figure 1:
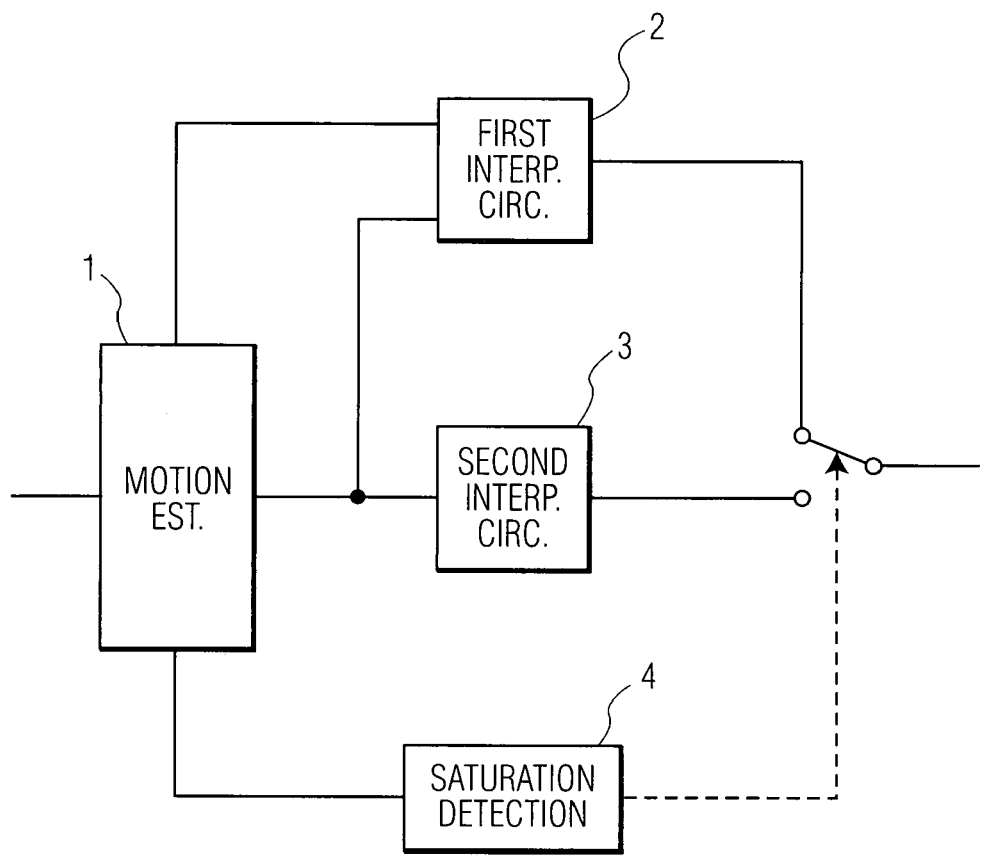
FIG. 1 represents such a device. The images at the input of the device are sent to a motion estimator 1 which provides a motion vector field. The images at the output of the motion estimator are sent in parallel to a first circuit 2 for interpolation on the basis of motion information, for example a first circuit for motion-compensated interpolation and a second interpolation circuit 3 which disregards the motion vector information, for example a circuit for non-motion-compensated temporal interpolation. The motion vector fields at the output of the motion estimator are sent in parallel to the interpolation circuit 2 so that it can carry out the motion-compensated interpolations and to a vector field saturation detection circuit 4 which utilizes the process described above. The saturation information originating from this saturation detection circuit controls the output of the device.

if this information indicates that the motion vector field is a saturating field, the circuit forces the output of the device onto the output of the second interpolation circuit 3.

if the information indicates that the motion vector field is a nonsaturating field, the circuit forces the output of the device onto the output of the first interpolation circuit 2.

if the information originating from this detection circuit gives no indication as to the quality of the motion vector field, that is to say if the variable Sat_Glob(t) lies in the hysteresis range, the output of the device remains connected to the same interpolation circuit as for the previous image.

Thus, depending on the saturation information for the motion vector field, the interpolation is a motion-compensated interpolation or a non-motion-compensated temporal interpolation.

What is claimed is:

1. Process for detecting saturation of a motion vector field relating to an image at the instant t, wherein it comprises the steps of:
    counting a number of motion vectors exceeding a detection threshold corresponding to a maximum operational amplitude, and which are less than a saturation threshold,
    comparing the counted number with at least one predetermined threshold, and
    declaring the motion vector field saturating when the counted number exceeds the predetermined threshold.

2. The process according to claim 1, further comprising the step of chopping the image into subimages m, wherein the counting is performed for each subimage m so as to yield a number Nb_sat(m,t), the comparing is performed for each of the subimages and, the field is declared saturating if this number is greater than the predetermined threshold for at least one of the subimages.

3. The process according to claim 2, wherein the detection threshold is smaller for the subimages for which better sensitivity of detection is desired.

4. The process according to claim 2, wherein the predetermined threshold is smaller for the subimages for which better sensitivity of detection is desired.

5. The process according to claim 2, wherein the field is declared saturating if at least one of the subimages possesses a number of vectors which is greater than a first threshold and in that the field is declared nonsaturating if the set of subimages possesses a number of vectors Nb_sat(m,t) which is less than a second predetermined threshold.

6. The process according to claim 5, wherein the first threshold is greater than the second threshold by a value determined so as to create a hysteresis.

7. A device for image interpolation comprising:
    a motion estimation circuit providing a motion vector field,
    a first circuit for temporal interpolation as a function of the motion vector field;
    a second circuit for non-motion-compensated temporal interpolation, and
    a motion field saturation detection circuit receiving the motion vector field and switching the output of the first interpolation circuit or of the second interpolation circuit over to the output of the device according to whether the circuit detects a non-saturating or saturating field respectively.

8. A process for interpolating an image sequence comprising: plementing a first type of interpolation on the basis of motion vectors and a second type of interpolation disregarding the motion vectors, the process comprising:

implementing a first type of interpolation when the motion vector field of the current image is declared non-saturating, said first type of interpolation being based on motion vectors;

implementing the second type of interpolation when the motion vector field of the current image is declared saturating, said second type of interpolation disregarding the motion vectors; and implementing a same type of interpolation as for the previous image when the when the motion vector field of the current image is not declared as saturating or non-saturating.

* * * * *